(12) United States Patent
Shimizu et al.

(10) Patent No.: US 7,718,843 B2
(45) Date of Patent: May 18, 2010

(54) IRON POWDER FOR ORGANIC CHLORINATED COMPOUND DECOMPOSITION AND DETOXIFYING TREATMENT METHOD USING THE SAME

(75) Inventors: Yoju Shimizu, Yamaguchi (JP); Yasuyuki Nagai, Yamaguchi (JP)

(73) Assignee: Tosoh Corporation, Yamaguchi (JP)

( * ) Notice: Subject to any disclaimer, the term of this patent is extended or adjusted under 35 U.S.C. 154(b) by 244 days.

(21) Appl. No.: 11/779,005

(22) Filed: Jul. 17, 2007

(65) Prior Publication Data
US 2008/0114198 A1 May 15, 2008

(30) Foreign Application Priority Data
Nov. 14, 2006 (JP) ............... P. 2006-307853

(51) Int. Cl.
B09C 1/08 (2006.01)
C02F 1/58 (2006.01)
C02F 1/70 (2006.01)
A62D 3/37 (2007.01)
C22C 38/08 (2006.01)

(52) U.S. Cl. .......... 588/319; 75/255; 210/757; 210/908; 252/188.1; 405/128.5; 420/27; 420/99; 420/119

(58) Field of Classification Search .......... 423/138, 423/700; 502/100, 300, 325, 326, 338, 400, 502/406, 416, 417; 588/313–320; 427/8–10, 427/16, 27, 99, 119
See application file for complete search history.

(56) References Cited

U.S. PATENT DOCUMENTS

| 2,694,647 | A | * | 11/1954 | Cole ............... 427/191 |
| 5,399,541 | A | * | 3/1995 | Ishii et al. ............ 502/326 |
| 2005/0109982 | A1 | * | 5/2005 | Yura et al. ............ 252/188.1 |

FOREIGN PATENT DOCUMENTS

| JP | 11-235577 A | 8/1999 |
| JP | 2000-5740 A | 1/2000 |
| JP | 2002-20806 A | 1/2002 |
| JP | 2002-167602 A | 6/2002 |
| JP | 2003-80220 A | 3/2003 |

(Continued)

OTHER PUBLICATIONS

Corpas Iglesias F. A., et al.: "Effect of Nitrogen on Sintered Duplex Stainless Steels" Powder Metallurgy 2003 vol. 46 No. 1 pp. 39-42.

(Continued)

*Primary Examiner*—Wayne Langel
*Assistant Examiner*—Syed Iqbal
(74) *Attorney, Agent, or Firm*—Sughrue Mion, PLLC (57) ABSTRACT

An iron powder for decomposition of organic chlorinated compounds, comprising from 0.03 to 0.5% by weight of Ni and from 0.005 to 5% by weight of carbon, wherein particles having a particle size of less than 53 μm occupies less than 40% by weight, is used. It is particularly preferable that Ni, carbon and iron are partially alloyed. When the iron powder for decomposition is used by mixing with, for example, an Ni-free iron powder, the total Ni content can be reduced without deterioration of decomposition performance to organic chlorinated compounds. The iron powder has high decomposition performance in the treatment of a solid such as soil.

20 Claims, 2 Drawing Sheets

FOREIGN PATENT DOCUMENTS

| | | |
|---|---|---|
| JP | 2003-105313 A | 4/2003 |
| JP | 2003-136051 A | 5/2003 |
| JP | 2004-57881 A | 2/2004 |
| JP | 2004-82106 A | 3/2004 |
| JP | 2004-305235 A | 11/2004 |
| JP | 2004-305792 A | 11/2004 |
| JP | 2005-34696 A | 2/2005 |
| JP | 2005-95750 A | 4/2005 |
| JP | 2005-118755 A | 5/2005 |

OTHER PUBLICATIONS

Extended European Search Report dated Feb. 28, 2008 issued in corresponding European Patent Application No. 071126031.1-2122.

Senzaki et al., Kogyo Yosul, vol. 391, 1991, p. 29.

European Office Action dated Aug. 19, 2009, issued in EP 07 112 603.1-2122.

* cited by examiner

IRON POWDER FOR ORGANIC CHLORINATED COMPOUND DECOMPOSITION AND DETOXIFYING TREATMENT METHOD USING THE SAME

FIELD OF THE INVENTION

The present invention relates to a treating agent for detoxification to materials to be treated, such as organic chlorinated compound-polluted soils, industrial wastes, sewage, sludge, wastewater and groundwater, and a detoxifying treatment method using the same.

BACKGROUND OF THE INVENTION

In recent years, environmental pollution problem by organic chlorinated compounds such as TCE (trichloroethylene), PCE (tetrachloroethylene), dichloro-methane, PCS (polychlorinated biphenyl) and dioxins is a big problem, and a treating agent for detoxification to soils, wastewater, groundwater and the like polluted by those organic chlorinated compounds, and its treatment method is investigated.

For example, a technique of reduction dechlorinating polluted wastewater and service water with an Fe powder or an Fe powder chemically plated with Ni or Cu is reported (for example, Non-Patent Document 1). However, dissolved oxygen in polluted wastewater and service water is required to remove in order to suppress performance deterioration with the lapse of time of such treating agents themselves. Further, the effect was not obtained unless the range of nickel plating amount showing activity is large.

In the case of a treatment method of polluted soils, sludge, sewage and the like, a method of treatment by adding an iron series treating agent containing carbon to polluted soils of a limited range (for example, Patent Document 1), and a treatment method of using an metal series treating agent comprising a combination of Fe with Ni, Cu and carbon (for example, Patent Documents 2 and 3) are reported particularly as a chemical treatment. However, it was not said that decomposition ability is sufficient.

Other than the above, decomposition of organic chlorinated compounds by a metal series treating agent comprising a combination of Fe with a different kind of elements is reported (for example, Patent Documents 4 and 5). However, in a high-active iron powder having a large proportion of fine particles of 50 μm or less by the method of strong pulverization, there was the problem in safety such as ignition. Further, in fine and high-active iron powder, it is difficult to uniformly mix the same with a solid material such as a soil, and sufficient decomposition performance was not exhibited.

Heretofore, an iron powder for decomposition of organic chlorinated compounds, containing Ni and carbon has been known. However, decomposition rate in soils was low, and a long time was required for the decomposition of sparingly-decomposable PCE. In order to improve those performances, it was necessary to increase the Ni content (Patent Documents 6 to 12).

[Non-Patent Document 1] Senzaki et al., Kogyo Yosui, Vol. 391, (1991), 29

[Patent Document 1] JP-A-11-235577
[Patent Document 2] JP-A-2000-5740
[Patent Document 3] JP-A-2002-20806
[Patent Document 4] JP-A-2003-80220
[Patent Document 5] JP-A-2003-136051
[Patent Document 6] JP-A-2003-105313
[Patent Document 7] JP-A-2004-57881
[Patent Document 8] JP-A-2004-305235
[Patent Document 9] JP-A-2004-305792
[Patent Document 10] JP-A-2005-95750
[Patent Document 11] JP-A-2005-34696
[Patent Document 12] JP-A-2005-118755

As the conventional agent which detoxifies soils, industrial wastes, sewage, sludge, wastewater, groundwater and the like polluted by organic chlorinated compounds, iron series decomposing agents containing different kinds of elements such as Ni and carbon are known. However, iron series decomposing agents that can decompose and clean the organic chlorinated compound faster than those decomposing agents were required. Particularly, in the conventional agents having activity increased by fine particles, it is difficult to disperse in the case of using the same in solid materials such as soils, and as a result, sufficient decomposition properties are not obtained. Further, there was the danger of ignition.

Further, in the conventional iron powder for decomposition of organic chlorinated compounds, it is necessary to increase Ni content in order to improve decomposition ability. Thus, an iron powder for decomposition of organic chlorinated compounds, having high treatment ability for cleaning soils and containing less Ni content was demanded.

SUMMARY OF THE INVENTION

As a result of keen investigations with respect to decomposition and clarification of organic chlorinated compounds in soils using an iron powder, the present inventors have found an iron powder which is excellent in decomposition of organic chlorinated compounds in treatment of solid materials such as soils and further has less Ni content.

The iron powder for decomposition of organic chlorinated compounds according to the present invention has high decomposition ability of sparingly-decomposable PCE and can be used by reducing the total Ni content without deterioration of decomposition ability to organic chlorinated compounds even by using the same by mixing with Ni-free iron powder and iron oxide.

The aims of the invention are accomplished by the following products and processes.

(1) An iron powder for organic chlorinated compound decomposition, comprising from 0.03 to 0.5% by weight of Ni and from 0.005 to 5% by weight of carbon.

(2) The iron powder for organic chlorinated compound decomposition as described in item (1) above, comprising from 0.1 to 0.5% by weight of Ni and from 0.005 to 5% by weight of carbon.

(3) The iron powder for organic chlorinated compound decomposition as described in items (1) and (2) above, comprising from 0.03 to less than 0.1% by weight of Ni and from 0.005 to less than 0.1% by weight of carbon.

(4) The iron powder for organic chlorinated compound decomposition as described in items (1) to (3) above, wherein the iron powder having a particle size of less than 53 μm is present in an amount of less than 40% by weight.

(5) The iron powder for organic chlorinated compound decomposition as described in items (1) to (4) above, wherein Ni is partially alloyed with iron.

(6) The iron powder for organic chlorinated compound decomposition as described in items (1) to (5) above, further comprising an Ni-free iron powder and/or iron oxide.

(7) The iron powder for organic chlorinated compound decomposition as described in items (1) to (6) above, wherein when the iron powder is added to and mixed with a soil containing 10 ppm of trichloroethylene and from 20 to 35% by weight of water in an amount of 1% by weight at room temperature, a decomposition rate constant until reaching the environmental standard (0.03 ppm) of trichloroethylene is 0.32/day or more.

(8) The iron powder for organic chlorinated compound decomposition as described in items (1) to (7) above, wherein when the iron powder is added to and mixed with a soil containing 10 ppm of trichloroethylene and from 20 to 35% by weight of water in an amount of 1% by weight at room temperature, a decomposition rate constant until reaching the environmental standard (0.03 ppm) of trichloroethylene is 0.8/day or more.

(9) The iron powder for organic chlorinated compound decomposition as described in items (1) to (8) above, wherein when the iron powder is added to and mixed with an aqueous solution containing 10 ppm of tetrachloroethylene in an amount of 1% by weight at room temperature, a decomposition rate constant until reaching the environmental standard (0.01 ppm) of tetrachloroethylene is 0.9/day or more.

(10) A detoxifying treatment method of organic chlorinated compounds, comprising treating materials to be treated which are polluted with organic chlorinated compounds, with the iron powder for organic chlorinated compound decomposition as described in any one of items (1) to (9) above.

DETAILED DESCRIPTION OF THE INVENTION

The present invention is described in detail below.

The iron powder for decomposition of organic chlorinated compounds (hereinafter referred to as an "iron powder for decomposition") according to the present invention comprises from 0.03 to 0.5% by weight of Ni and from 0.005 to 5% by weight of carbon, as its compositional range. As described before, the Ni content in the iron powder used for soil clarification is preferable to be small. The Ni content is preferably in a range of from 0.1 to 0.5% by weight and from 0.005 to 5% by weight of carbon, or from 0.03% by weight to less than 0.1% by weight and from 0.005% by weight to less than 0.1% by weight of carbon.

Carbon contained in the iron contributes to decomposition of organic chlorinated compounds. The iron powder for decomposition of the present invention has high decomposition ability to organic chlorinated compounds even though the carbon content is from 0.005% by weight to less than 0.1% by weight.

The iron powder for decomposition of the present invention preferably comprises coarse particles as a main component, wherein the powder having a particle size of less than 53 μm is present in an amount of less than 40% by weight. The conventional iron powder for decomposition contains many active fine particles, and even in the case that coarse particles are present in a large amount, the amount of particles of less than 53 μm was about 50% by weight. When such an iron powder was used in solid materials such as soils, uniform mixing was difficult, and it was difficult to exhibit its performance.

Further, in the particle size of the conventional iron powder for decomposition, the amount of particles having a particle size of less than 53 μm corresponding to dangerous material, class 2, occupies 50% by weight or more, and there was the problem in ignition property. The iron powder for decomposition of the present invention can use further safely by that amount of particles having a particle size of less than 53 μm is less than 40% by weight. The particle size distribution can be evaluated by sieving particles with a sieve (270 mesh) and measuring the weight.

The iron powder for decomposition of the present invention is preferably that Ni and iron are partially alloyed. In the state that Ni is merely dotted on the iron powder (non-alloyed state), local cell action is weak, which is not preferable. By making Ni and iron partially alloy, the local cell action effect increases, and safety is exhibited. On the other hand, where Ni and iron are completely alloyed, effective local cell is not formed, and it is difficult to obtain the effect of the present invention. Further, partial alloying is effective to suppress deterioration of reduction action due to separation of Ni and iron.

As the existing site of the partial alloy of Fe and Ni, the alloy part does not occupy the entire surface of the iron particles, but it is preferable that Ni site and alloyed site are present on the iron powder surface, respectively. Where the entire surface of the iron powder is covered with the alloy, local cell action is difficult to develop, and decomposition of organic chlorinated compounds is difficult to occur. The partial alloying can confirm an alloy layer (diffusion layer of Ni) using EPMA (electron probe microanalyzer) and TEM (transmission electron microscope).

Similar to Ni, carbon in the iron powder for decomposition of the present invention is desirably that carbon alone site and an alloy part of iron and carbon are present. In general, pure iron, steel, cast iron, pig iron and the like can be used as the iron powder. Iron portions and iron-carbon alloyed portions such as cementite, present in those iron powders can be acted as active points. However, the iron powder for decomposition of the present invention exhibits high organic chlorinated compound decomposition ability even by such low carbon steel having small carbon content.

Powder shape of the iron powder for decomposition is not particularly limited, and includes spherical shape, dendritic shape, piece shape, needle shape, angular shape, laminate shape, rod shape, plate shape and sponge shape. Specific surface area of the iron powder for decomposition is 0.05 $m^2/g$ or more, and preferably from 0.2 to 10 $m^2/g$, thereby decomposition reaction rate and contact probability to materials to be cleaned can be improved and sparingly-decomposable Cis-DCE, MC and PCE can be decomposed in a short period of time. The specific surface area is a value measured using BET method.

In the present invention, organic chlorinated compounds can be decomposed at a high rate without using other additives, but use of other additives is not excluded. Examples of the other additives that can be used include antioxidants, reaction accelerators, dispersing agents, pH regulators and deoxidants. Examples of the antioxidant include sodium sulfite, ferrous sulfate, ferric sulfate and ascorbic acid. Examples of the reactor accelerator include sodium chloride and sodium sulfate. Examples of the dispersing agent include active carbon, alumina, zeolite, silica gel, silica-alumina and iron powder.

The iron powder for decomposition of the present invention may be used by mixing with an Ni-free iron powder or iron oxide (hereinafter referred to as a "mixed iron powder"). The iron powder for decomposition of the present invention can further decrease the total Ni amount introduced into soils without deteriorating the decomposition ability to organic chlorinated compounds, even in a form of such a mixed iron powder.

The proportion of the iron powder for decomposition in the mixed iron powder of the present invention is preferably 30% by weight or more. Where the amount of the iron powder for decomposition is less than 30% by weight, the decomposition ability tends to deteriorate.

The iron oxide used in the present invention is not particularly limited, but ferrous oxide, ferric oxide, magnetite, bertholide and the like, and more specifically, iron sand and iron mineral which are generally easily commercially available, are used.

Where the addition amount of the iron powder for decomposition or the mixed iron powder introduced into soils is small, it is difficult to uniformly mix or uniformly contact with soils, and decomposition ability to the organic chlorinated compound deteriorates. The iron powder for decomposition of the present invention is advantageous in that when used in a form of the mixed iron powder, the amount of the iron powder for decomposition added to soil per unit weight can further be decreased.

The cause that the mixed iron powder maintains the decomposition ability is not clear, but it is thought that the iron powder for decomposition is contacted with other iron powder or iron oxide to form a network in soils or an aqueous solution, thereby developing a cell action similar to the iron powder for decomposition having high decomposition ability, even on the surface of other iron powder or iron oxide.

The iron powder for decomposition of the present invention particularly has high decomposition ability to organic chlorinated compounds in a soil. When the iron powder for decomposition (or as a mixed iron powder) is added to and mixed with a soil containing 10 ppm of trichloroethylene (TCE) and from 20 to 35% by weight of water in an amount of 1% by weight at room temperature, a decomposition rate constant until reaching the environmental standard (0.03 ppm) of trichloroethylene is preferably 0.32/day or more, more preferably 0.35/day or more, and further preferably 0.8/day or more.

It is well known that the organic chlorinated compounds in soils are easily decomposed with increasing water in a soil. When water in a soil is 10% by weight or more, and particularly 15% or more, the decomposition performance of the iron powder for decomposition becomes almost constant (decomposition rate is saturated). The decomposition rate constant of the iron powder for decomposition of the present invention is a value when the iron powder for decomposition is added in an amount of 1% by weight at room temperature to a soil having water of from 20 to 35% by weight at which those decomposition performances become constant.

The relationship of decomposition rate is generally expressed by the following rate equation.

$$\ln(C_1/C_0) = -k \cdot t$$

$C_1$: Arrival concentration of trichloroethylene (ppm)
$C_0$: Initial concentration of trichloroethylene (ppm)
k: Rate constant (/day or /hr)
t: Time (day or hr)

In the decomposition in a soil, the decomposition rate constants of 0.32/day, 0.35/day and 0.8/day correspond to that days required to clean up a soil polluted by 10 ppm of trichloroethylene to the environmental standard (0.03 ppm) are 18 days, 17 days and 7 days, respectively.

The iron powder for decomposition of the present invention is preferable as the decomposition rate constant is large. However, sharp generation of the decomposition gas is dangerous. Therefore, the decomposition rate constant is preferably 2/days or less. The decomposition rate constant of 2/days corresponds to about 3 days as the day required for decomposition until reaching the environmental standard.

The iron powder for decomposition of the present invention is excellent even in decomposition performance to organic chlorinated compounds in an aqueous solution, and particularly, it is preferable that the decomposition rate constant of tetrachloroethylene until reaching the environmental standard (0.01 ppm) when added in an aqueous solution containing 10 ppm of sparingly-decomposable tetrachloroethylene (PCE) in an amount of 1% by weight at room temperature is 0.9/day or more, and particularly 1.1/day or more. The upper limit is not particularly limited, but is largely 2/day or less.

It is well known that the decomposition becomes fast as the amount of the iron powder for decomposition added to a polluted soil increases. When the addition amount of the iron powder for decomposition to a soil is in a range of from 0.5 to 3% by weight, the relationship according to largely the following empirical equation is obtained between the addition amount and the reaction rate constant.

Therefore, it is possible to mutually compare performance of iron powders for decomposition from the decomposition rate constants obtained from the results of different addition amounts.

$$ka = c \cdot kb(a/b)^{1/2}$$

ka: Rate constant when a decomposing agent is added to a polluted product in an amount of a % by weight.
kb: Rate constant when a decomposing agent is added to a polluted product in an amount of b % by weight.
c: constant A production method of the iron powder for decomposition is described below.

In the present invention, the iron powder is obtained by that the composition of Ni and carbon is controlled to the scope of the present invention, and those are mechanically pulverized in order to partially alloy with iron mainly on particle surface. The pulverization method can use a batchwise or continuous pulverizer of a vibration mill among general ball mills. In particular, a pulverizer having high mechanical strength to an extent such that raw materials are alloyed is preferably used. It is necessary to conduct the pulverization under the conditions that partial alloying proceeds in a range that the iron powder for decomposition obtained is satisfied with the particle size of the present invention.

For example, a method wherein the charged proportion of pulverizing media such as steel balls is 2 to 10 times 1 part by weight of a mixture of an iron powder, an Ni powder and a carbon powder, and the vibration frequency is from 600 to 2,000 vpm can be exemplified. The processing time is from 0.5 to 10 hours, and a partial alloy in which an Ni component and a trace carbon component are segregated can be obtained. When the Ni content is 0.1% by weight or more, the processing time is preferably from 1 to 5 hours.

The iron used as the production raw material is not particularly limited, and reduced iron, pure iron and cast iron which are industrially available, a free-cutting steel powder, a magnetic iron powder and the like can be used. Ni which is used as a production raw material is not particularly limited, and for example, a high purity Ni powder and a nickel compound (such as carbonyl nickel) can be used.

In particular, where any of Ni and carbon contents is lower than 0.1% by weight, it is preferable that the processing time is from 5 to 10 hours.

Conventionally, it was known that regarding partial alloying of Ni, when the processing time is prolonged, alloying excessively proceeds (that is, a partial alloy becomes a complete alloy), and decomposition performance deteriorates. Where Ni or C content is low, it was thought that the processing time is better to be short so as not to excessively proceed alloying. In the present invention, it has been found that when the amount of Ni or carbon to be alloyed is small, activity is improved in a certain range that the processing time is long, and as a result, an iron powder for decomposition having high decomposition performance to organic chlorinated compounds, which has not hitherto been obtained, has been obtained.

When the iron powder for decomposition of the present invention is used as a mixed iron powder with other materials, the iron powder for decomposition obtained by the method described above and other iron powder or iron oxide are mixed uniformly.

The mixing method is not particularly limited, and a V-shaped mixer, a screw-type mixer, a ball mill, a vibration mill and the like can be used. Where the mixing is not uniform, the performance of the mixed iron powder is not sufficiently exhibited. Therefore, it is preferable to uniformly mix the iron powder for decomposition with other iron powder or iron oxide.

A detoxifying treatment method of organic chlorinated compounds using the iron powder for decomposition of the present invention is described below.

The detoxifying treatment method of the present invention includes 1) a method of adding the iron powder for decomposition of the present invention to an excavated soil, and continuously uniformly mixing with a drum-type scrubber, a reforming mixer, a vibration-type mixer, a kneader or the like, or a method of batchwise mixing with a vibration mixer, a backhoe or the like, and then backfilling the mixture; 2) an in-situ treatment method of drilling a vertical or horizontal well in a polluted soil, and injecting the iron powder for decomposition with high pressure air or high pressure water; 3) an in-situ treatment method of injecting the iron powder for decomposition, or if necessary, a slurry of the iron powder for decomposition and a dispersing agent, a reaction accelerator, a pH modifier or the like, into a soil, 4) a method of cleaning by forming a cleaning wall containing the iron powder for decomposition around polluted groundwater, and 5) a cleaning pit method of providing a layer of the iron powder for decomposition at a position lower than the position of polluted groundwater.

The addition amount of the iron powder for decomposition varies depending on, for example, a pollution concentration of materials to be treated which should be cleaned. The iron powder for decomposition of the present invention has very high activity, and therefore can clean to the environmental standard value or less corresponding to each organic chlorinated compounds in a smaller addition amount than that of the conventional agent. When the iron powder for decomposition of the present invention is used, it is preferable that the amount in the case of a powder form is from 0.1 to 10% by weight to the amount of materials to be treated such as wetted soil or groundwater considering its decomposition activity and economic properties, and particularly, from 1 to 3% by weight further considering homogeneous mixing properties. The "% by weight" used herein means % by weight of the iron powder for decomposition of organic chlorinated compounds excluding additives when the additives are added to the iron powder for decomposition of organic chlorinated compounds as described above.

The iron powder for decomposition of the present invention exhibits the similar high decomposition performance (decomposition rate) to not only solid materials such as a soil, but groundwater and waste water, containing organic chlorinated compounds.

The iron powder for decomposition of the present invention can decompose organic chlorinated compounds at high rate particularly in a soil, and is free from worry of a secondary metal pollution in soil cleaning because of smaller Ni content than the conventional iron powder.

The present invention is described further specifically by Examples, but the invention is not construed as being limited thereto.

Examples 1 to 5 and Comparative Examples 1 to 4

Evaluation test of a detoxifying agent in a polluted soil containing organic chlorinated compounds was conducted.

As a raw material iron powder of an iron powder for decomposition, Examples 1 and 2 used a reduced iron powder (carbon content: 0.05%), Examples 3 to 5 used a cast iron powder (carbon content: 3 to 5%), Comparative Examples 1, 3 and 4 used a reduced iron powder (carbon content: 0.8%), and Comparative Example 2 used a pure iron powder (carbon content: 0.01%), Example 13, 14, 17 and 18 used a reduced iron powder (carbon content: 0.006%). Further, carbonyl nickel (purity: 99%, particle size: 4 to 7 µm) was used as a raw material Ni powder.

Pulverization conditions of the iron powder for decomposition in Examples 1 to 5 and Comparative Examples 1 to 4 were as follows. Fe powder and Ni powder, containing a given amount of carbon, were mixed in given amounts. The resulting mixture was treated under the conditions that the charged amount of pulverizing media is 6 times per 1 part by weight of the mixture and vibration frequency is 600 vpm, using a vibration mill (trade name V-MILL, BM-3, 1,200 vpm, 6.6 liters pot, a product of Chou Kakohki Co., Ltd.). Nitrogen gas flow rate during processing was 40 ml/min. The processing time was all 2 hours.

1 kg of 10 ppm TCE-polluted soil (water content: 33% by weight), internal benzene dissolved in methanol, and 10 g (1% by weight to the soil) of a treating agent were charged, and were homogeneously mixed for 1 minute using a vibration type mixer. As the reaction conditions, about 30 g of the treated soil was sealed in a 125 ml vial container, and reaction was conducted in a static state at 20° C. A gas layer part was periodically analyzed with gas chromatography, and change of TCE concentration with the passage of time was investigated. Water used for adjusting water content in a soil was not subjected to a dissolved oxygen-removal treatment and a pH adjustment.

Composition, particle size and decomposition rate constant of the iron powder for decomposition used are shown in Table 1.

TABLE 1

| | Ni content | Carbon content | Particle size µm | Days of decomposition | Rate constant (/day) |
|---|---|---|---|---|---|
| Example 1 | 0.1% | 0.05% | 53 µm, 35% | 11 | 0.53 |
| Example 2 | 0.5% | 0.05% | 53 µm, 35% | 7 | 0.83 |
| Example 3 | 0.1% | 5% | 53 µm, 35% | 7 | 0.83 |
| Example 4 | 0.5% | 5% | 53 µm, 35% | 6 | 0.97 |
| Example 5 | 0.3% | 3% | 53 µm, 35% | 10 | 0.58 |
| Comparative Example 1 | 0% | 0.8% | 53 µm, 35% | >120 | <0.05 |

TABLE 1-continued

|  | Ni content | Carbon content | Particle size μm | Days of decomposition | Rate constant (/day) |
|---|---|---|---|---|---|
| Comparative Example 2 | 0.5% | 0.01% | 53 μm, 35% | 23 | 0.25 |
| Comparative Example 3 | 2% | 0.8% | 53 μm, 35% | 21 | 0.28 |
| Comparative Example 4 | 0.3% | 0.8% | 53 μm, 65% | 19 | 0.31 |

From Examples 1 to 5, by adding 1% by weight of the iron powder for decomposition to TCE-polluted soil and mixing those, the TCE concentration reached less than the environmental standard 0.03 ppm in 6 to 11 days. Further, the decomposition product was ethylene as the main component, and organic chlorinated compounds listed in items of the environmental standard was not formed.

On the other hand, Comparative Example 1 did not contain Ni, and the concentration did not reach less than the environmental standard even by passing through 4 months. Comparative Example 2 was that the carbon content in the iron powder is small and the processing conditions of the iron powder for decomposition are not met. Therefore, 23 days were required for decomposition. Comparative Example 3 is an agent containing excess amount of Ni, but the effect of decomposition ability was not developed, and 21 days were required for cleaning. Comparative Example 4 is that Ni content and carbon content are within a range of the iron powder for decomposition of the present invention, but the particles having the particle size of 280 mesh under (53 μm) occupy 65%, and the agent is very fine iron powder. Day required for decomposition is 19 days. The iron powder is too fine, and sufficient performance was not obtained.

In the iron powders for decomposition of Examples 1 to 5 of the present invention, the ability to decompose other VOC as well as TCE in a soil is remarkable, and legal regulation value can be reached in a short period of time.

When the iron powder for decomposition of Example 5 was added in an amount of 2% by weight under the same conditions, the TCE concentration reached the environmental standard in about 2.7 days.

Examples 6 to 10 and Comparative Examples 5 to 7

The evaluation of the iron powder for decomposition of the present invention was similarly conducted to PCE-containing polluted aqueous solution.

100 ml of 10 ppm PCE aqueous solution, internal benzene dissolved in methanol, and 1 g (1% by weight to the aqueous solution) of a treating agent were added to a 125 ml vial container, and the container was sealed. The reaction conditions were at 20° C. and shaking in 200 rpm. The aqueous solution was not subjected to a dissolved oxygen-removal treatment and a pH adjustment.

As an analytical method of PCE concentration, a head space method based on JIS K 0125 (test method of a volatile organic compound in service water and wastewater) was used, PCE concentration was quantitatively analyzed with the passage of time, and decomposition days that the PCE concentration reached less than the environmental standard value was obtained. Those results are shown in Table 2.

TABLE 2

|  | Ni content | Carbon content | Particle size μm | Days of decomposition | Rate constant (/day) |
|---|---|---|---|---|---|
| Example 6 | 0.1% | 0.05% | 53 μm, 35% | 7 | 0.98 |
| Example 7 | 0.5% | 0.05% | 53 μm, 35% | 5 | 1.38 |
| Example 8 | 0.1% | 5% | 53 μm, 35% | 5 | 1.38 |
| Example 9 | 0.5% | 5% | 53 μm, 35% | 4 | 1.73 |
| Example 10 | 0.3% | 3% | 53 μm, 35% | 7 | 0.98 |
| Comparative Example 5 | 0% | 0.8% | 53 μm, 35% | >90 | <0.08 |
| Comparative Example 6 | 0.5% | 0.01% | 53 μm, 35% | 16 | 0.43 |
| Comparative Example 7 | 2% | 0.8% | 53 μm, 35% | 15 | 0.46 |

Examples 6 to 10 are that the PCE concentration reaches less than the environmental standard value of 0.01 ppm within 7 days, and even though the iron powder for decomposition of the present invention containing given amounts of Ni and carbon is course particles, the iron powder maintained high decomposition ability even in an aqueous solution.

Further, in the Examples of the present invention, the decomposition product is ethylene as the main component, and organic chlorinated compounds in the items of the environmental standard was not formed.

Comparative Example 5 is an Ni-free iron powder, and less than the environmental standard of 0.01 ppm was not reached even by passing through 3 months. Further, ethylene, and TCE and cis-DCE which are listed in the items of the environmental standard were detected in the decomposition product.

Comparative Example 6 is a decomposing agent containing small amount (0.01%) of carbon, and 16 days were required for decomposition.

Comparative Example 7 is that Ni is excess. 15 days were required for decomposition, and the performance was not sufficient as compared with the iron powder for decomposition of the present invention.

Therefore, when the iron powders for decomposition of Examples 6 to 10 are used, the ability to decompose each organic chlorinated compounds including PCE which has many cases in polluted groundwater is remarkable, and the legal regulation value can be reached in a short period of time.

Example 11

The iron powder for decomposition of Example 5 (shown as Example 5 iron powder in FIG. 1) and an Ni-free iron powder (shown as a cast iron powder, carbon content: 3%) were mixed with V-type mixer ball mill for 0.5 hour to prepare mixed iron powders having different mixing ratios.

Figure 1:
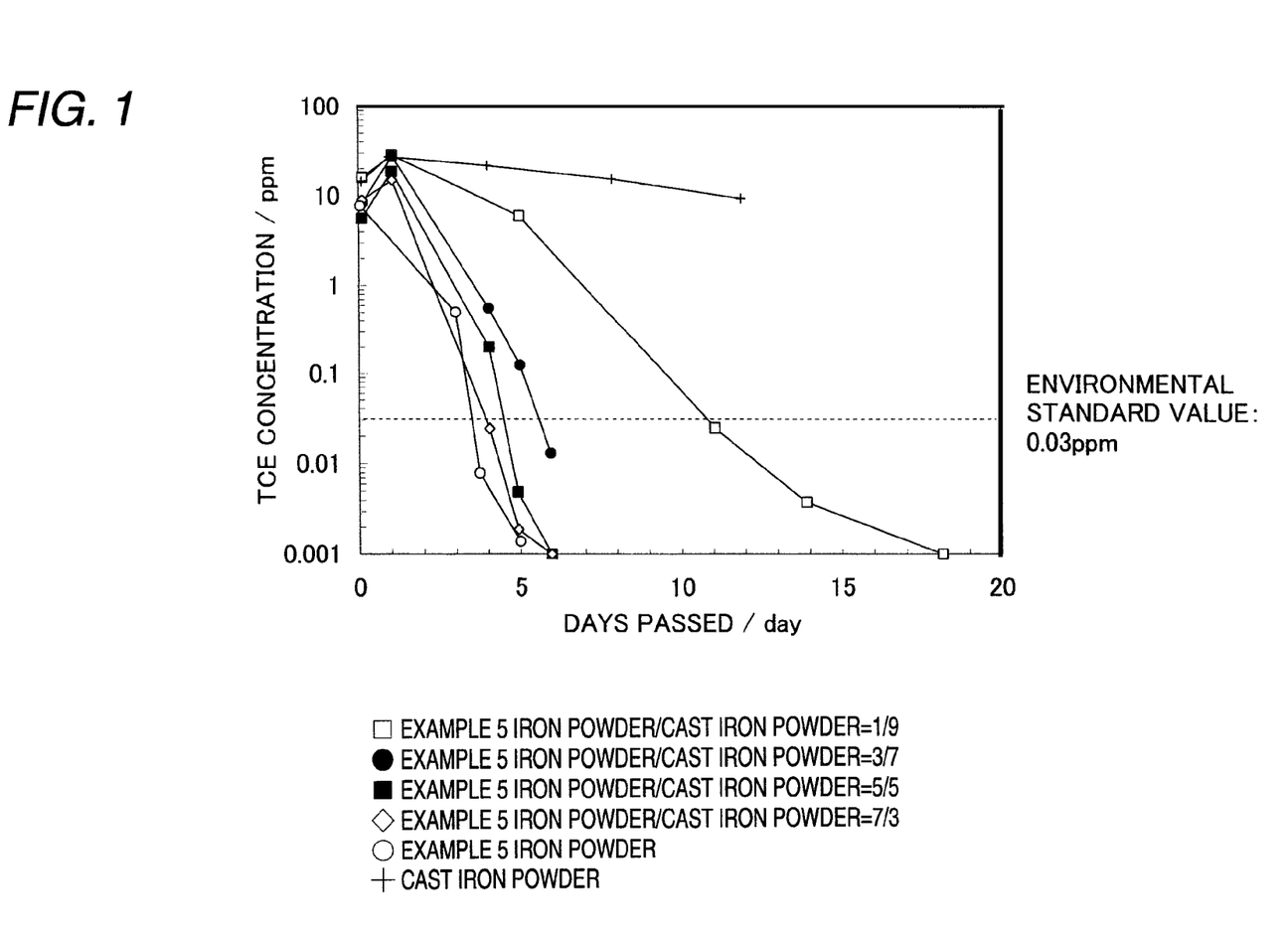
FIG. 1 is a view showing TCE decomposition performance in an aqueous solution by an iron powder of the iron powder for decomposition, an Ni-free iron powder or the both of them.

100 ml of 10 ppm TCE aqueous solution, internal benzene dissolved in methanol, and 1 g (1% by weight to the aqueous solution) of the mixed iron powder were added to a 125 ml vial container, and the container was sealed. The reaction conditions were at 20° C. and shaking in 200 vpm. The aqueous solution was not subjected to a dissolved oxygen-removal treatment and a pH adjustment.

As an analytical method of TCE concentration, a head space method based on JIS K 0125 (test method of a volatile organic compound in service water and wastewater) was used, TCE concentration was quantitatively analyzed with the passage of time, and decomposition days that the TCE concentration reached less than the environmental standard value was obtained. Those results are shown in FIG. 1.

In the mixed iron powder containing 30% by weight or more of the iron powder for decomposition, the same degree of the decomposition performance as that of 100% iron powder for decomposition was exhibited. Ni content in the mixed iron powder in the case the iron powder 30% was 0.09% by weight.

Example 12

Similar to Example 11, the iron powder for decomposition of Example 5 (shown as Example 5 iron powder in FIG. 1) and an Ni-free iron powder (shown as a cast iron powder, carbon content: 3%) were mixed with V-type mixer ball mill for 0.5 hour to prepare mixed iron powders having different mixing ratios.

Figure 2:
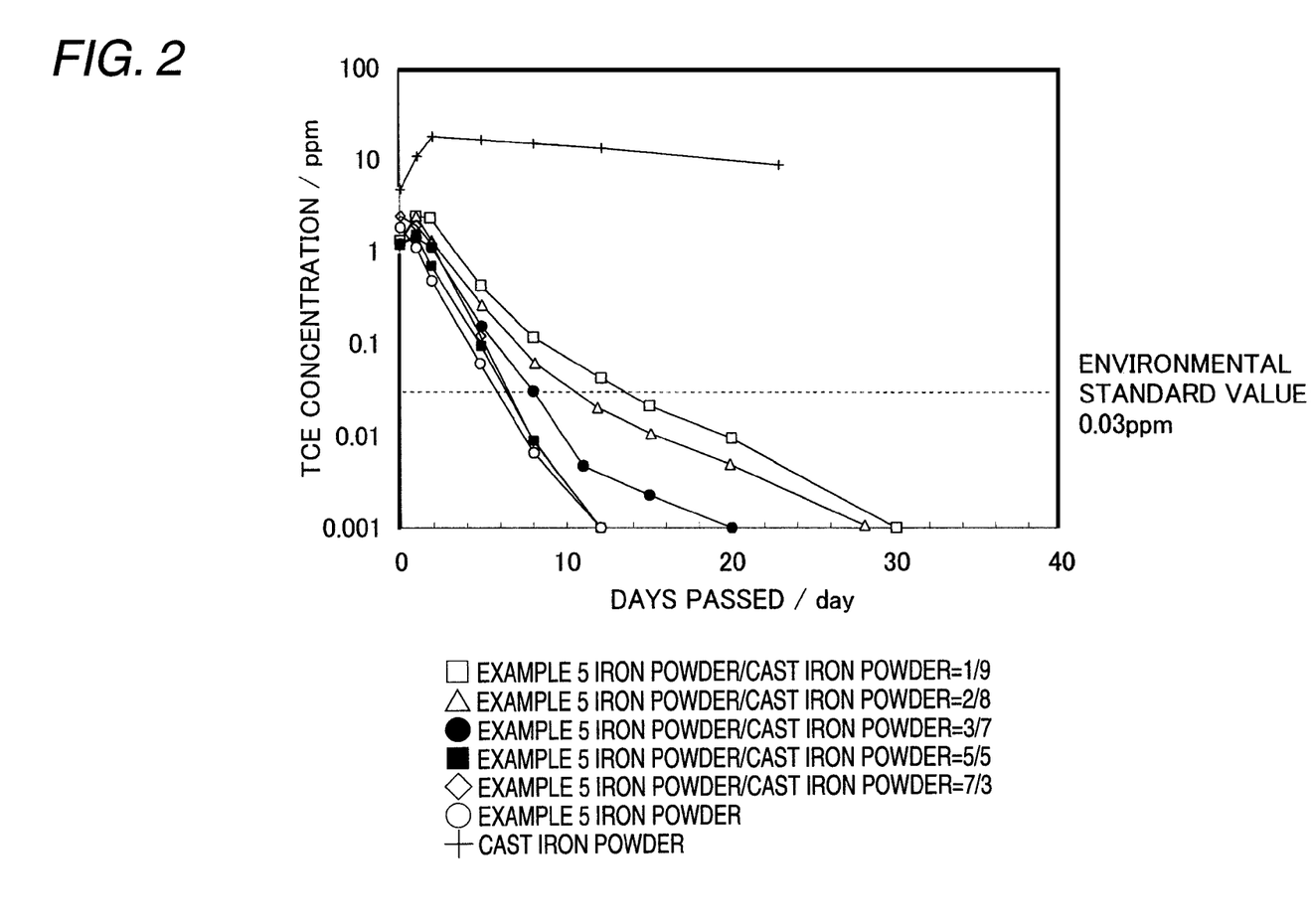
FIG. 2 is a view showing TCE decomposition performance in a soil by an iron powder of the iron powder for decomposition, an Ni-free iron powder or the both of them.

1 kg of 10 ppm TCE-polluted soil (water content: 33% by weight), internal benzene dissolved in methanol, and 10 g (1% by weight to the soil) of the mixed iron powder were charged, and were homogeneously mixed with a vibration mixer for 1 minute. As the reaction conditions, about 30 q of the treated soil was sealed in a 125 ml vial container, and reaction was conducted in a static state at 20° C. A gas layer part was periodically analyzed with gas chromatography, and change of TCE concentration with the passage of time was investigated. Water used for adjusting water content in a soil was not subjected to a dissolved oxygen-removal treatment and a pH adjustment. The results are shown in FIG. 2.

In the mixed iron powder containing 30% by weight or more of the iron powder for decomposition, the same degree of the decomposition performance as that of 100% the iron powder for decomposition was exhibited even in a soil.

Examples 13 and 14

Iron powders for decomposition were produced under the same conditions as in Example 1, except that in the pulverization conditions of the iron powder for decomposition, the processing time was 6 hours, Ni content was 0.3% and carbon was 0.006%. TCE decomposition behaviors in a soil and an aqueous solution, containing 10 ppm of trichloroethylene are shown in Table 3.

Further high decomposition rate was obtained.

Example 15

Iron oxide (magnetite) was blended with a partially alloyed iron powder for decomposition containing 0.3% of Ni and 3% of carbon, and trichloroethylene (TCE) in an aqueous solution was decomposed with the blend.

The environmental standard was achieved in 7 days by the treatment under the same conditions as in Example 11, except for adding 1 g of 1:2 mixed iron powder for decomposition and iron oxide (1% by weight to the aqueous solution, corresponding to 0.33% by weight to the iron powder for decomposition alone) was added to 10 ppm TCE aqueous solution.

Example 16

The environmental standard was reached in 18 days by the addition of 2% by weight of the same mixed iron powder (Example 15) to 10 ppm TCE-polluted soil (water content: 20% by weight).

By mixing the iron powder for decomposition with iron oxide which does not have decomposition ability by itself, despite that the amount of the iron powder for decomposition used is small, decomposition proceeds in a short period of time, and the decomposition efficiency per unit weight of the iron powder for decomposition having decomposition activity to TCE was improved.

TABLE 3

|  | Ni content | Carbon content | Particle size μm | Days of decomposition | Rate constant (/day) |
| --- | --- | --- | --- | --- | --- |
| Example 13 | 0.3% | 0.006% | 53 μm, 35% | 6 | 0.97 |
| Example 14 | 0.3% | 0.006% | 53 μm, 35% | 5 | 1.16 |
| Example 15 | 0.3% | 3% | 53 μm, 35% | 7 | 0.83 |
| Example 16 | 0.3% | 3% | 53 μm, 35% | 18 | 0.32 |

Examples 17 and 18

A reduced iron powder (carbon content: 0.006%) was used as a raw material of the iron powder for decomposition, and carbonyl nickel (purity: 99%, particle size: 4 to 7 μm) was used as an Ni powder, to obtain iron powders for decomposition having Ni content of 0.05% and 0.09%.

Reduced iron powder and carbonyl nickel powder were mixed in given amounts. The resulting mixture was treated under the conditions that pulverizing media are charged in an amount of 6 times per 1 part by weight of the mixture and vibration frequency is 600 vpm, using a vibration mill (trade name V-MILL, BM-3, 1,200 vpm, 6.6 liters pot, a product of Chou Kakohki Co., Ltd.). Nitrogen gas flow rate during processing was 40 ml/min. The processing time was all 6 hours.

1 kg of 10 ppm TCE-polluted soil (water content: 33% by weight), internal benzene dissolved in methanol, and 10 g (1% by weight to the soil) of the iron powder were charged, and were homogeneously mixed for 1 minute using a vibration mixer. As the reaction conditions, about 30 g of the treated soil was sealed in a 125 ml vial container, and reaction was conducted in a static state at 20° C. A gas layer part was periodically analyzed with gas chromatography, and time that the TCE concentration is satisfied with the environmental standard was measured. Water used for adjusting water content in a soil was not subjected to a dissolved oxygen-removal treatment and a pH adjustment.

TABLE 4

|  | Ni content | Carbon content | Particle size μm | Days of decomposition | Rate constant (/day) |
| --- | --- | --- | --- | --- | --- |
| Example 17 | 0.09% | 0.006% | 53 μm, 35% | 7 | 0.83 |
| Example 18 | 0.05% | 0.006% | 53 μm, 35% | 8 | 0.73 |

In the Examples, by adding 1% by weight of the iron powder for decomposition to TCE-polluted soil and mixing those, the TCE concentration reached less than the environmental standard 0.03 ppm in 7 to 8 days. Further, the decomposition product was ethylene as the main component, and organic chlorinated compounds listed in the items of the environmental standard was not formed.

While the invention has been described in detail and with reference to specific embodiments thereof, it will be apparent to one skilled in the art that various changes and modifications can be made therein without departing from the spirit and scope thereof.

What is claimed is:

1. An iron powder for organic chlorinated compound decomposition, comprising from 0.03 to 0.5% by weight of Ni and from 0.005 to 5% by weight of carbon, wherein Ni is partially alloyed with iron of the iron powder.

2. The iron powder for organic chlorinated compound decomposition as claimed in claim 1, comprising from 0.1 to 0.5% by weight of Ni and from 0.005 to 5% by weight of carbon.

3. The iron powder for organic chlorinated compound decomposition as claimed in claim 1, comprising from 0.03 to less than 0.1% by weight of Ni and from 0.005 to less than 0.1% by weight of carbon.

4. The iron powder for organic chlorinated compound decomposition as claimed in claim 1, wherein the iron powder having a particle size of less than 53 μm is present in an amount of less than 40% by weight.

5. The iron powder for organic chlorinated compound decomposition as claimed in claim 1, further comprising an Ni-free iron powder, iron oxide or the both of them in addition to the iron powder for organic chlorinated compound decomposition.

6. The iron powder for organic chlorinated compound decomposition as claimed in claim 1, wherein when the iron powder is added to and mixed with a soil containing 10 ppm of trichloroethylene and from 20 to 35% by weight of water in an amount of 1% by weight at room temperature, a decomposition rate constant until reaching the environmental standard 0.03 ppm of trichloroethylene is 0.32/day or more.

7. The iron powder for organic chlorinated compound decomposition as claimed in claim 1, wherein when the iron powder is added to and mixed with a soil containing 10 ppm of trichloroethylene and from 20 to 35% by weight of water in an amount of 1% by weight at room temperature, a decomposition rate constant until reaching the environmental standard 0.03 ppm of trichloroethylene is 0.8/day or more.

8. The iron powder for organic chlorinated compound decomposition as claimed in claim 1, wherein when the iron powder is added to and mixed with an aqueous solution containing 10 ppm of tetrachloroethylene in an amount of 1% by weight at room temperature, a decomposition rate constant until reaching the environmental standard 0.01 ppm of tetrachloroethylene is 0.9/day or more.

9. A detoxifying treatment method of organic chlorinated compounds, comprising treating materials to be treated which are polluted with organic chlorinated compounds, with an iron powder for organic chlorinated compound decomposition comprising from 0.03 to 0.5% by weight of Ni and from 0.005 to 5% by weight of carbons wherein Ni is partially alloyed with iron of the iron powder.

10. The detoxifying treatment method as claimed in claim 9, wherein the iron powder for organic chlorinated compound decomposition comprises from 0.1 to 0.5% by weight of Ni and from 0.005 to 5% by weight of carbon.

11. The detoxifying treatment method as claimed in claim 9, wherein the iron powder for organic chlorinated compound decomposition comprises from 0.03 to less than 0.1% by weight of Ni and from 0.005 to less than 0.1% by weight of carbon.

12. The detoxifying treatment method as claimed in claim 9, wherein the iron powder having a particle size of less than 53 μm is present in an amount of less than 40% by weight in the iron powder for organic chlorinated compound decomposition.

13. The detoxifying treatment method as claimed in claim 9, wherein the iron powder for organic chlorinated compound decomposition further comprises an Ni-free iron powder, iron oxide or the both of them in addition to the iron powder for organic chlorinated compound decomposition.

14. The detoxifying treatment method as claimed in claim 9, wherein with a soil containing 10 ppm of trichloroethylene and from 20 to 35% by weight of water in an amount of 1% by weight at room temperature and a decomposition rate constant until reaching the environmental standard 0.03 ppm of trichloroethylene is 0.32/day or more.

15. The detoxifying treatment method as claimed in claim 9, wherein the iron powder for organic chlorinated compound decomposition is added to and mixed with a soil containing 10 ppm of trichloroethylene and from 20 to 35% by weight of water in an amount of 1% by weight at room temperature and a decomposition rate constant until reaching the environmental standard 0.03 ppm of trichloroethylene is 0.8/day or more.

16. The detoxifying treatment method as claimed in claim 9, wherein the iron powder for organic chlorinated compound decomposition is added to and mixed with an aqueous solution containing 10 ppm of tetrachloroethylene in an amount of 1% by weight at room temperature and a decomposition rate constant until reaching the environmental standard 0.01 ppm of tetrachloroethylene is 0.9/day or more.

17. The iron powder for organic chlorinated compound decomposition as claimed in claim 5, wherein said Ni-free iron powder is cast iron powder.

18. The iron powder for organic chlorinated compound decomposition as claimed in claim 5, wherein said iron oxide is magnetite.

19. The detoxifying treatment method as claimed in claim 9, wherein said Ni-free iron is cast iron powder.

20. The detoxifying treatment method as claimed in claim 9, wherein said iron oxide is magnetite.

\* \* \* \* \*